United States Patent
Oishi et al.

[11] Patent Number: 5,364,908
[45] Date of Patent: Nov. 15, 1994

[54] PROCESS FOR MAKING RESIN COMPOSITION AND RESIN COMPOSITION

[75] Inventors: Masafumi Oishi, Kyoto; Hiroshi Nishimoto, Otsu; Takao Ando; Yukio Shibata, both of Kyoto; Toshiaki Okamoto; Katsura Gohda, both of Takatsuki, all of Japan

[73] Assignee: Sanyo Chemical Industries, Ltd., Kyoto, Japan

[21] Appl. No.: 732,907

[22] Filed: Jul. 19, 1991

[30] Foreign Application Priority Data

Jul. 20, 1990 [JP] Japan .................................. 2-193367
Nov. 15, 1990 [JP] Japan .................................. 2-310290

[51] Int. Cl.$^5$ ...................... C08L 27/06; C08L 33/20
[52] U.S. Cl. ...................................... 525/64; 525/65;
525/66; 525/70; 525/79; 525/80; 525/90;
525/92; 525/93; 525/94; 525/95; 525/107;
525/123; 525/242; 525/243; 525/244; 525/262;
525/267; 525/301
[58] Field of Search ................. 525/55, 107, 123, 242,
525/243, 244, 262, 267, 301, 64, 66, 70, 79, 80,
90, 92, 93, 94, 95, 65

[56] References Cited

U.S. PATENT DOCUMENTS

| | | | |
|---|---|---|---|
| 3,892,717 | 7/1975 | Mori et al. | 525/388 |
| 4,745,135 | 5/1988 | Thomas et al. | 525/130 |
| 5,080,968 | 1/1992 | Riew et al. | 525/109 |
| 5,084,510 | 1/1992 | Braden et al. | 525/66 |

*Primary Examiner*—John Kight, III
*Assistant Examiner*—John M. Cooney, Jr.
*Attorney, Agent, or Firm*—Oblon, Spivak, McClelland, Maier & Neustadt

[57] ABSTRACT

Resin compositions of improved dispersibility and mechanical properties are obtained by polymerizing a polymerizable compound (A), insitu in a melted thermoplastic resin (B), in the presence of a dispersant (C) reactive or compatible with at least one of the resin (B) and polymerizate of (A).

Suitable dispersants include those represented by the general formula (1) or (2)

$$R_1-L(X-M-X-L)_nX-M-R_2 \qquad (1)$$

$$R_1-L(X-M-X-L)_n-R_2 \qquad (2)$$

wherein $R_1$ and $R_2$ are groups, such as hydrocarbyl acyl, alkoxy, hydroxyl, mercapto, amino, epoxy, isocyanate, carboxylic, carboxylic anhydride, carboxylic halide and aldehyde groups; L and M are residues of a polymer having a number average molecular weight of about 500–about 3,000,000, the difference in solubility parameter between the residue L or M and the resin (B) or polymerizate of (A) being not more than 0.5; X is a residue of a difunctional compound, such as organic diisocyanates, dicarboxylic acids, diamines, diols and diepoxides, the molecular weight of X being not more than a quater of that of L and M; and n is 0 or an integer of at least 1.

27 Claims, No Drawings

PROCESS FOR MAKING RESIN COMPOSITION AND RESIN COMPOSITION

BACKGROUND OF THE INVENTION

1. Field of the Invention

This invention relates to a resin composition. More particularly, it relates to a composite resin composition comprising two or more different resins.

2. Description of the Prior Art

Heretofore, as methods for producing composite resin compositions comprising two or more incompatible resins, there have been known those by kneading under melting the component resins separately produced beforehand, and those by polymerizing insitu in a thermoplastic resin a polymerizable compound capable of forming a resin incompatible with the thermoplastic resin.

These known methods, however, have drawbacks, that several stages are required for separate production of the component resins, and that, because of insufficient dispersibility of the resulting resin composites, effects of composite are not fully attained and result in poor mechanical properties (such as impact resistance and tensile strength).

SUMMARY OF THE INVENTION

It is an object of the present invention to provide a resin composition of improved dispersibility of component resins.

It is another object of this invention to provide a method for producing a resin composition within short manufacturing process.

It is still another object of the invention to provide a resin composition of improved mechanical properties, such as impact resistance and tensile strength.

Briefly, these and other objects of this invention as hereinafter will become more readily apparent have been attained broadly by polymerizing a polymerizable compound (A), insitu in a melted thermoplastic resin (B), in the presence of a dispersant reactive or compatible with at least one of the resin (B) and polymerizate of (A).

DETAILED DESCRIPTION OF THE PREFERRED EMBODIMENTS

In this invention, suitable thermoplastic resins (B) include vinyl polymers, polyesters, polyamides, polyimides, polyethers and polyurethanes.

Suitable vinyl polymers include (co)polymers (polymers and copolymers; similar expressions are used hereinafter) of one or more vinyl compounds. Illustrative of suitable vinyl compounds are aliphatic hydrocarbon monomers, for example, olefins containing 2 to 8 or more carbon atoms (such as ethylene, propylene, butene-1, isobutene, 4-methylpentene-1 and octenes), and dienes (such as butadiene and isoprene); substituted or unsubstituted aromatic monomers, for example, styrene and styrene homologues or substituted styrenes, including alkyl($C_1$-$C_{18}$)styrenes (such as alpha-methylstyrene, o-, m-and p-methylstyrenes, p-ethylstyrene, 2,4-dimethylstyrene, p-n-butylstyrene, p-t-butylstyrene, p-n-hexylstyrene, p-n-octylstyrene, p-n-nonylstyrene and p-n-decylstyrene), aryl-substituted styrenes (such as p-phenylstyrene, p-cumylstyrene), alkoxy-or acyloxy-substituted styrenes (such as p-methoxystyrene and acetoxystyrene), hydroxystyrene and halogen-substituted styrenes (such as p-chlorostyrene, 3,4-dichlorostyrene); unsaturated mono- or polycarboxylic acids [such as (meth)acrylic, ethacrylic, crotonic, sorbic, maleic, fumaric, itaconic and sinnamic acids], and derivatives thereof [anhydrides, (partial) esters, nitriles and amides], for instance, (meth)acrylic monomers, including alkyl($C_1$-$C_{18}$) (meth)acrylates [such as methyl, ethyl, n- and i- butyl, propyl, n-octyl, 2-ethylhexyl, dodecyl, lauryl and stearyl (meth)acrylates], aryl (meth)acrylates [such as phenyl (meth)acrylates], hydroxyl-containing (meth)acrylates [such as hydroxyethyl (meth)acrylates], epoxy-containing (meth)acrylates [such as glycidyl (meth)acrylates], the corresponding (partial) esters of the other carboxylic acids (such as monomethyl maleate, dimethyl maleate and di-2-ethylhexyl maleate), nitrile-containing monomers [such as (meth)acrylonitriles], amide-containing monomers [such as (meth) acrylamides], and anhydrides (such as maleic anhydride); and other vinyl monomers, for instance, vinyl esters (such as vinyl acetate, vinyl propionate and vinyl butyrate), vinyl ethers (such as methyl vinyl ether, ethyl vinyl ether, iso-propyl vinyl ether, butyl vinyl ether and iso-butyl vinyl ether), vinyl ketones (such as vinyl methyl ketone, vinyl hexyl ketone and methyl isopropenyl ketone), halogen-containing vinyl monomers (such as vinyl chloride, vinyl bromide, vinylidene chrolide and tetrafluoroethylene), and the lice; as well as combinations of two or more of them.

Exemplary of suitable vinyl polymers are olefinic (co)polymers, for example, polyethylene (hereinafter referred to as PE), polypropylene (hereinafter referred to as PP), copolymers of ethylene (ethylene content: 20-80% by weight or more), including ethylene/$C_3$-$C_8$ olefin(s) copolymers [such as ethylene/propylene copolymer (hereinafter referred to as E/P) and ethylene/-butene-1 copolymer], olefin/diene copolymers (such as EPDM), ethylene/vinyl acetate copolymer and ethylene/(meth) acrylate copolymers, and derivatives [halogenated products, adducts with a maleic acid derivative (such as maleic anhydride), and oxidates] of polyolefins, such as chlorinated PP, maleic acid-modified PP and PE oxidates; styrenic (co)polymers, including polystyrene (hereinafter referred to as PS) and styrene copolymers (styrene content: 30-100% by weight), such as styrene/(meth)acrylic monomer copolymers; (meth)acrylic (co)polymers, such as polyacrylic acid, polymethyl methacrylate, polyacrylonitrile, polyacrylamide and (partially) hydrolyzed polyacrylamide; and other vinyl (co)polymers, such as polyvinylalcohol, polyvinyl acetate, polybutadiene, polyvinylchloride, polytetrafluoroethylene, ABS resin, AS resin and the like. Among these, preferred are PE, PP, E/P, PS and polyvinyl acetate.

Suitable polyesters of (B) include, for example, polycondensates of a dicarboxylic acid component with a diol component, polycondensates of a hydroxycarboxylic acid, and ring-opening polymers of a lactone or a cyclic carbonate. Illustrative of suitable dicarboxylic acid components are aromatic dicarboxylic acids, such as terephthalic, isophthalic, phthalic and naphthalene dicarboxylic acids; anhydride, esters and halides of these acids, such as phthalic anhydride, dimethyl terephthalate and terephthalic dichloride; $C_2$-$C_{30}$ aliphatic dicarboxylic acids, such as adipic, sebacic, maleic and dodecane dicarboxylic acids, and dimer acids (such as dimerized linolenic acid); and anhydride, esters and halides of these acids, such as maleic anhydride, dimethyl adipate and adipic dichloride. Among these, preferred are terephthalic, isophthalic and naphthalene dicarboxylic acids. Examples of suitable diol components are aliphatic diols, including $C_2$-$C_6$ alkylene glycols, such as ethylene glycol (hereinafter referred to as EG), 1,2- and 1,3-propane diols, 1,4-butanediol (hereinafter referred to as TMG), 1,6-hexane diol and neopentyl glycol, dialkylene glycols, such as diethylene glycol and dipropylene glycol, cycloaliphatic diols, such as cyclohexane dimethanol, and alcoholates (such as sodium alcoholate) of these diols; aromatic diols, such as bisphenols (such as bisphenol A, bisphenol S and bisphenol F) and hydroquinone, and esters and alcholates of these phenols (such as diacetylbisphenol A and bisphenol A disodium alcoholate); polyether diols, including adducts of alkylene oxides (hereinafter referred to as AO) [$C_2$-$C_4$ AO, such as ethylene oxide, propylene oxide and tetrahydrofuran (hereinafter referred to as EO, PO and THF, respectively)] to these diols, such as EO and/or PO adducts of bisphenol A, and EO and/or PO adducts of bisphenol F; polyalkylene glycols, such as polyethylene glycol and polypropylene glycol (hereinafter referred to as PEG and PPG, respectively), and polytetramethyleneether glycol. Among these, preferred are EG and TMG. Suitable lactones include, for example, epsilon-caprolactone (hereinafter referred to as CL). Illustrative of hydroxycarboxylic acids are p-hydroxy-benzoic acid. Suitable cyclic carbonates are inclusive of alkylene carbonates, such as ethylene carbonate and propylene carbonate. Illustrative examples of polyesters include aromatic polyesters, such as polyethylene terephthalate (hereinafter referred to as PET), polybutylene terephthalate (hereinafter referred to as PBT), polycondensates of bisphenol A with terephthalic acid and/or isophthalic acid, and polycondensates of p-hydroxybenzoic acid; aliphatic polyesters, such as polyethylene adipate (hereinafter referred to as PEA), polybutylene adipate, and polylactones, such as polycaprolactone (hereinafter referred to as PCL); polycarbonates, such as polyethylene carbonate; as well as copolyesters of two of more of these; and also polyether polyesters, such as copolycondensates of components constituting these polyesters with AO (such as EO and/or PO) or polyalkylene glycols (such as PEG and PPG). Polyesters may be hydroxyl-terminated or carboxyl-terminated. Among these polyesters, preferred are PCL, PET and PBT.

Suitable polyamides of (B) include, for example, nylons, such as 6-, 6,6-, 6,10-, 11-, 12- and 4,6-nylons; and copolyamides of two or more of these; as well as copolycondensates of components constituting these polyamides with components constituting polyesters and/or AO (such as EO and/or PO) or polyalkylene glycols (such as PEG and PPG).

Examples of suitable polyimides of (B) include polycondensates of diamines (such as 1,4-diaminobenzene) with polycarboxylic acids (such as pyromellitic acid) or anhydride thereof; as well as polyamideimides, such as copolycondensates of components constituting these polyimides with components constituting polyamides.

Suitable polyethers include, for instance, polyoxymethylenes; polyacetals, such as homopolymers of trioxane and copolymers of trioxane with EO, dioxorane, substituted dioxoranes, 1,4-dioxane or the like; polyaryl ethers, such as polyphenylene oxides, polyphenylene sulfides; polyether ketones; polysulfones, such as polyarylsulfones; and copolyethers of two or more of these.

Suitable polyurethanes of (B) are inclusive of reaction products of an organic diisocyanate component with a difunctional active hydrogen atom-containing component. Suitable difunctional active hydrogen atom-containing compounds include low molecular weight diols and polyether diols, for example, aliphatic diols (such as $C_2$-$C_6$ alkylene glycols), aromatic diols, alkylene oxide adducts thereof and polyalkyleneglycols, mentioned above as the raw materials for polyesters; and polyester diols, for example, polycondensates of a dicarboxylic acid component with a diol component and ring-opening polymerization products of a lactones, as mentioned above. Other examples of active hydrogen atom-containing components are diamines, for example, (cyclo)aliphatic diamines, such as isophorone diamine, 4,4'-diamino-dicyclohexylmethane and 4,4'-diamino-3,3'-dimethyl-dicyclohexylmethane; aromatic diamines, such as 4,4'-diaminodiphenylmethane (hereinafter referred to as MDA) and diethyltolylene diamines; and polyether diamines, such as aminoethylated products of polyether diols (such as PEG) as above. Among these active hydrogen atom-containing components, preferred are high molecular weight diols (polyether diols and/or polyester diols, having a molecular weight of usually 500–10,000 or higher, preferably 1,000–5,000), and combinations thereof with low molecular weight diols (particularly alkylene glycols) and/or diamines [Weight ratio of high molecular weight diols/low molecular weight diols and/or diamines: generally 100/0–70/30, preferably 99/1–90/10]. Suitable organic diisocyanates (hereinafter referred to as DI) include, for example, aromatic DI containing 6–20 carbon atoms (except carbon atoms in NCO groups), such as 2,4- and/or 2,6-tolylene diisocyanates (hereinafter referred to as TDI), 4,4'- and/or 2,4'-diphenylmethane diisocyanates (hereinafter referred to as MDI), and naphthylene diisocyanate; cycloaliphatic DI containing 4–15 carbon atoms, such as isophorone diisocyanate (hereinafter referred to as IPDI), dicyclohexylmethane diisocyanate (hereinafter referred to as $H_{12}$MDI), cyclohexylene diisocyanate and diisocyanatomethylcyclohexane; aliphatic DI containing 2–18 carbon atoms, such as hexamethylene diisocyanate (hereinafter referred to as HDI), tetramethylhexamethylene diisocyanate and lysine diisocyanate; araliphatic DI containing 8–15 carbon atoms, such as xylylene diisocyanate; and modified DI of these DI (such as modified ones containing urethane, carbodiimide, allophanate, urea, biuret, urethdione, urethonimine, isocyanurate and/or oxazolidone groups); and NCO-terminated prepolymer derived from these polyisocyanates with active hydrogen atom-containing components described above; as well as mixtures of two or more of them. Among these, preferred are IPDI, $H_{12}$MDI and HDI. In producing polyurethanes, the DI component and the active hydrogen atom-containing component may be reacted step-wise via prepolymer, or in one-shot process. NCO index is usually 70–130, preferably 95–110. Polyurethanes may be OH-terminated or NCO-terminated, or may be terminated with monofunctional compounds (such as monohydric alcohols, monoamines and/or monoisocyanates).

Among these thermoplastic resins (B), preferred are vinyl polymers, polyesters, polyamides and polyethers; particularly preferred are polyolefinic (co)polymers.

In general, thermoplastic resins (B) have a number-average molecular weight (hereinafter referred to as Mn) of about 10,000–about 3,000,000 or higher, preferably about 10,000–about 1,000,000. Melting temperature of (B), which can be varied in accordance with the kind of (B) as far as the resin don't thermally decomposed at the temperature, may vary from room temperature to about 400° C. or higher.

Polymerizable compounds (A) used in this invention include polyaddition polymerizable compounds, polycondensation polymerizable compounds, addition polymerizable compounds and ring-opening polymerizable compounds, capable of forming thermoplastic resins; and polyaddition polymerizable compounds, addition condensation polymerizable compounds, polycondensation polymerizable compounds and addition polymerizable compounds capable of forming thermosetting resins.

Examples of suitable polyaddition polymerizable compounds are precursors for polyurethanes, comprising an active hydrogen atom-containing component and polyisocyanate component, and include, for example, difunctional active hydrogen atom-containing components and DI components, as mentioned above, capable of forming thermoplastic polyurethanes; and combinations of these components with trifunctional or higher active hydrogen atom-containing compounds (for example, polyhydric alcohols 3–8 or more hydroxyl groups, such as glycerol, trimethylol propane, pentaerythritol, sorbitol and sucrose; polyamines, such as diethylene triamine and triethylene tetramine; and alkanol amines, such as triethanol amine) and/or trifunctional or higher polyisocyanate [such as triphenylmethane triisocyanate, polymethylene polyphenyl polyisocyanates (PAPI), tris(isocyanato-phenyl) thiophosphate, adduct of trimethylol propane with HDI (molar ratio ⅓), and trimer of HDI], capable of forming thermosetting polyurethanes. These active hydrogen atom-containing component and polyisocyanate component may be partly reacted into NCO-terminated or hydroxyl- or amino-terminated prepolymers. NCO index is usually 70–130, preferably 95–110. Higher NCO index, for instance, 130–150 or higher may also be used to form polyisocyanurates.

Other examples of polyaddition polymerizable compounds are combinations of a polyepoxide (uncured epoxy resin) with a curative therefor, capable of being thermoset into cured epoxy resins. Suitable polyepoxides and curatives therefor include conventionally employed ones, as described in "EPOXY RESINS" published 1957 by McGraw-Hill. Examples of suitable polyepoxides are glycidyl ethers, for instance, those of phenol or bisphenol ether type [adducts of epichlorhydrin with phenolic compounds, including aromatic diols, such as bisphenols (such as bisphenol A and bisphenol F), phenol novolak, cresol novolak, cresorcinol and the like], phenol epoxy resins, aromatic epoxy resins, cycloaliphatic epoxy resins, ether type epoxy resins (adducts of epichlorhydrin with polyols, polyether polyols and the like), such as diglycidyl ether, triglycidyl ethers of polyols (such as glycerol), polyarylglycidyl ether, and so on; glycidyl esters, for example, copolymers of glycidyl (meth)acrylate with other ethylenically unsaturated monomers (such as acrylonitrile); glycidyl amines, such as glycidyl ether of p-aminophenol; non-glycidyl polyepoxides, such as epoxidized polyolefins and epoxidized soyabean oil, and the like; as well as modified products of these epoxy resins (such as modified products of epichlorhydrin with bisphenol A). Among these, preferred are glycidyl ethers of bisphenols, phenol novolak and cresol novolak Epoxy resins usually have an epoxy equivalent of generally 140–4000, preferably 190–500, and usually a number-average molecular weight of about 200—about 10,000. Suitable epoxy curatives are inclusive of polyamines and polycarboxylic acid(anhydride)s. Illustrative of polyamines are aliphatic polyamines, for example, alkylene diamines, such as ethylene diamine (hereinafter referred to as EDA), tetramethylene diamine and hexamethylene diamine (hereinafter referred to as HDA); polyalkylene polyamines, such as diethylene triamine and triethylene tetramine; alkylor hydroxyalkyl-substituted polyamines, such as alkylaminopropylamines and aminoethylethanolamine; araliphatic polyamines, such as xylylene diamine; polyether polyamines, such as polyoxypropylene polyamines; and cycloaliphatic or heterocyclic aliphatic polyamines, such as N-aminoethyl piperazine, 1,3-diamino-cyclohexane and isophorone diamine); aromatic polyamines, for example, phenylene diamine, tolylene diamine and diphenylmethane diamine; polyamide polyamines, for example, condensates of polyamines as above with polymeric fatty acids (such as dimer acid); guanamine compounds, for example, benzoguanamine, alkylguanamines, and modified products of them; and dicyandiamide. Examples of suitable polycarboxylic acid(anhydride)s include succinic, maleic, itaconic, sebacic and pyromellitic acids, and phenylene bis(3-butane-1,2-dicarboxylic acid); as well as anhydrides of these acids. These epoxy resins and curatives may be partly reacted into epoxy oligomers or amine adducts.

Suitable polycondensation polymerizable compounds are precursors for polyesters, polyamides and/or polyimides, comprising a polycarboxylic acid component and a polyol component and/or polyamine component; and include combinations of dicarboxylic acids with diols and/or diamines, as mentioned above, capable of forming thermoplastic polyesters and/or polyamides [for example, combinations of dicarboxylic acids (such as terephthalic and adipic acids) with diols (such as ethylene and butylene glycols) and/or diamines (such as HDA)]; and combinations of tetrabasic acids (such as pyromellitic acid) with diamines (such as 1,4-diaminobenzene), capable of forming polyimide resins.

Suitable addition polymerizable compounds include vinyl compounds, as mentioned above, or oligomers therefrom, capable of forming thermoplastic vinyl polymers; and combinations of a vinyl compound as above, with a crosslinking vinyl monomer containing two or more polymerizable double bonds [such as divinyl benzene, methylenebis(meth)acrylamides and (poly)ethyleneglycol di(meth)acrylates], capable of forming thermoset vinyl polymers; as well as unsaturated polyesters or oligomers thereof, with or without a vinyl monomer as above (such as styrene), capable of forming thermoset polyester resins. Suitable unsaturated polyesters include conventionally employed ones, for example, those obtainable by reaction of a diol as mentioned above (such as ethylene and butylene glycols) with an unsaturated dicarboxylic acid(anhydride) (such as maleic, fumaric and itaconic acids and anhydrides of them), with or without a saturated dicarboxylic acid (anhydride) (such as succinic, adipic and phthalic acids and anhydrides of them).

Suitable ring-opening polymerizable compounds include, for example, cyclic esters, such as CL; cyclic amides, such as epsilon-caprolactam; and cyclic ethers, such as EO, PO and THF.

Examples of suitable addition condensation polymerizable compounds are precursors for phenolic resins and amino resins (such as urea and melamine resins), comprising combinations of an aldehyde (such as formaldehyde) with a phenol (such as phenol and cresols), a urea (such as urea and substituted ureas) and/or a melamine (melamine and substituted melamines); as well as precondensates of them.

Among these polymerizable compounds (A), preferred are polyaddition polymerizable compounds, for example; combinations of a polyepoxide resin and a curative therefor, and particularly combinations of an active hydrogen atom-containing component and polyisocyanate component.

Dispersants (C), used in the present invention, are reactive or compatible with at least one of the resin (B) and polymerizate of (A).

Suitable dispersant (C) include, for example, polymers containing structural units substantially same as the resin (B) or polymerizate of the compound (A) and having at least one reactive group selected from the group consisting of isocyanate, carboxylic, carboxylic anhydride, carboxylic halide, amino, hydroxyl, aldehyde and epoxy groups; and polymers comprising (a) a moiety of a polymer containing structural units substantially same as polymerizate of said compound (A) and (b) a moiety of a polymer containing structural units substantially same as said resin (B). Mn of the moiety (a) and Mn of the moiety (b) is usually about 500–about 3,000,000, preferably about 1,000–about 1,000,000. The moiety (a) and the moiety (b) can be linked through a linker, as mentioned below. In the above, the term "substantially same structural units" may be substituted with the term "substantially same solubility parameter", that is, difference in solubility parameter between the two polymers being not more than 0.5. Solubility parameter (hereinafter referred to as SP) is represented by a square root of quotient of cohesive energy density derided by molecular volume:

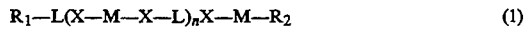

$$SP = \sqrt{\Delta E/V}$$

wherein Delta E is cohesive energy density and V is molecular volume. SP can be measured and caluculated according to Robert F. Fadors, and there may be used the data described in Polymer Engineering and Science, vol. 14, pages 151–154. The values of SP of illustrative polymers are as follows: vinyl polymers: PE=8.6, PP=8.0, PS=10.6, polymethyl methacrylate=9.9; polyesters: PET=12.4, PBT=11.7; polyamides: 6-nylon=11.9, 6,6-nylons=11.9; polyimide: polycondensate of pyromellitic acid with 1,4-diaminobenzene=19.6; polyethers: polyphenylene ether=11.2, polyoxymethylene=10.0; polyurethanes: polyadduct of 1,4-butane diol with MDI=12.3; and epoxy resins: 2/1 adduct of bisphenol A diglycidyl ether with MDA=13.0. These values of SP may be influenced by differences in the particular polymer structure or the end structure of the polymer.

Examples of suitable dispersants include those represented by the general formula (1) or (2):

$$R_1-L(X-M-X-L)_nX-M-R_2 \quad (1)$$

$$R_1-L(X-M-X-L)_n-R_2 \quad (2)$$

In the formulae (1) and (2), $R_1$ and $R_2$ are independently selected from the group consisting of hydrocarbyl, acyl, alkoxy, hydroxyl, mercapto, amino, epoxy, isocyanate, carboxylic, carboxylic anhydride, carboxylic halide and aldehyde groups. Hydrocarbyl groups of $R_1$ and $R_2$ include (cyclo)aliphatic ones, for example, alkyl groups containing 1–18 or more carbon atoms [such as methyl, ethyl, n- and i- butyl, propyl, n-octyl, 2-ethylhexyl, dodecyl, lauryl and stearyl groups], alkenyl groups containing 2–18 or more carbon atoms (such as oleyl group), and cycloalkyl groups containing 4–18 or more carbon atoms (such as cyclohexyl group); and aromatic ones, for instance, aryl, alkylaryl and aralkyl groups containing 6–18 or more carbon atoms (such as phenyl, 4-ethylphenyl and benzyl groups). Acyl groups are inclusive of carbon acyl groups represented by the formula: R—CO—, wherein R is a hydrocarbyl group as mentioned above, and examples thereof are acetyl and propionyl groups. Alkoxy groups include those containing 1–18 or more carbon atoms, corresponding to the above alkyl groups, such as $CH_3$—O— and $(CH_3)_3C$—O—. Amino groups of $R_1$ and $R_2$ include primary amino group ($NH_2$), and secondary amino groups represented by the formula: R—NH—, wherein R is a hydrocarbyl group as mentioned above. Carboxylic (anhydride) groups of $R_1$ and $R_2$ include, for example, carboxyl (COOH), and dicarboxylic acid residues [such as —CH(COOH)CH$_2$COOH obtainable by maleic acid modification]. Exemplery of carboxylic halide groups are —COCl and —COBr.

Preferably, $R_1$ and $R_2$ are selected, according to the kind of the resin (B) and polymerizate of (A), so as to provide high affinity to or reactivity with the resin (B) and polymerizate of (A). For instance, preferable examples of $R_1$ and $R_2$ are: hydrocarbyl groups, for vinyl polymers (such as PE, PP and PS); hydroxyl, mercapto, carboxylic (anhydride) and epoxy groups, for polyesters; amino and carboxylic (anhydride) groups, for polyamides and/or polyimides; isocyanate and carboxylic (anhydride) groups, for polyethers; and isocyanate, epoxy, hydroxyl, mercapto and carboxylic (anhydride) groups, for polyurethanes.

In the formulae (1) and (2), L and M are residues of polymers having a Mn of about 500—about 3,000,000, from which the terminal groups have been eliminated, the difference in SP between the residue L and the resin (B) or polymerizate of (A) being not more than 0.5, the difference in SP between the residue M and the resin (B) or polymerizate of (A) being not more than 0.5. In the above, the terminal groups include, $R_1$, $R_2$ and terminal functional groups (such as hydroxyl, isocyanate, carboxylic, amino and/or mercapto groups) for forming linkages with X.

Illustrative of the residue L are vinyl polymer chains, for example, polyolefin chains, such as PE chain, PP chain, and PS chain; and moieties of polyurethane, polyester, polycarbonate, polyamide, polyimide, polyamideimide, polyacetal, polyether, polyetheretherketone, polysulfide or polysulfone, from which the terminal functional groups (such as hydroxyl, isocyanate, carboxylic, amino and/or mercapto groups) have been eliminated. Examples of the residue M include the same ones as the residue L. Polymers, from which the terminal groups are eliminated, have a molecular weight (hereinafter referred to as MW) of usually about 500–about 3,000,000, preferably about 1,000–about 1,000,000. Preferable examples of the residues L and M include residues of polymers having a MW of about 1,000–about 1,000,000, obtainable by reaction (coupling or chain-extention) of oligomer chains (for instance, PP chain, PS chain and polyamide chain) having a MW of about 500–about 20,000, containing one or more reactive groups (such as hydroxyl, carboxylic and amino groups) introduced thereinto, with a difunctional compound (for example, DI, dicarboxylic acids, diamines, diols and diepoxides as described bellow as examples of X).

The residues L and M are selected in accordance with the SP of the resin (B) or polymerizate of (A). The difference in between the residue L or M and the resin B) or polymerizate of (A) is usually not more than 0.5, preferably not more than 0.2. more preferably not more than 0.1. Most preferably, the residue L or M and the resin (B) or polymerizate of (A) have the same SP; and particularly have the same or substantially same structural unis as those of (B) or polymerizate of (A). It is preferred that, when one of the residues L and M has the SP difference not more than 0.5 from the resin (B), the other residue has the SP difference not more than 0.5 from polymerizate of (A). Both L and M may have the SP difference not more than 0.5 from one of the polymers [the resin (B) and polymerizate of (A)], in case where the other polymer has high affinity to or reactivity with at least one of $R_1$ and $R_2$.

Illustrative examples of combinations of the residues L and M, the resin (B) and polymerizates of (A) are as follows. (The numbers in the brackets [ ] represent the value of SP of these polymers.)

1) L is PS oligomer chain [10.6] and M is urethane oligomer [10.5] from PCL and MDI, when (B) is PS resin [10.8] and polymerizate [10.5] from (A) being PCL and MDI, wherein the diference in SP between L and (B) is 0 and that between M and polymerizate of (A) is 0;

2) L is hydrogenated isoprene oligomer chain [8.2] and M is PS oligomer [10.6], when (B) is PP resin [8.0] and polymerizate [10.6] from (A) being styrene monomer, wherein the diference in SP between L and (B) is 0.2 and that between M and polymerizate of (A) is 0.

Polymers constituting the residues L and M usually have reactive terminal groups, such as hydroxyl, carboxylic, carboxylic halide and amino groups, preferably hydroxyl groups, to be linked with the residue X.

In the formulae (1) and (2), n is 0 or an integer of at least 1, preferably 0–3, more preferably 0.

In the formulae (1) and (2), X is a residue of a difunctional compound (hereinafter referred to as linker) for linking between L and M. Suitable linkers include, for example, DI, dicarboxylic acids, diamines, diols, diepoxides, and monocarboxylic acids containing a hydroxyl or amino group. Examples of these compounds include those mentioned above, with respect to (A) or raw materials of (B). Illustrative of these compounds are: DI, such as TDI, MDI, IPDI and HDI, and NCO-terminated prepolymers prepared from these DI with diols; dicarboxylic acids, such as succinic and adipic acids, and halides thereof (such as succinic and adipic dichlorides); diamines, such as EDA, trimethylene diamine and HDA; diols, such as EG, TMG and hexamethylene diols; and diepoxides, such as alpha,omega-hexamethylene diepoxide and alpha, omega-polyoxyethylene diepoxide. Other examples of linkers are dihalides, for instance, alkylene dichloride containing 1–8 or more carbon atoms (such as methylene dichloride). Among these, preferred are DI, such as TDI, MDI, IPDI and HDI; dicarboxylic acids, such as succinic and adipic acids and dichlorides of them. Particularly preferred are TDI, MDI, IPDI and HDI. As linkers for introducing X, in stead of these difunctional compounds, there may be used precursors therefor, for example, AO (such as EO, PO) for diols, acid anhydrides (such as succinic anhydride) for dicarboxylic acids, lactones (such as CL) for hydroxycarboxylic acids and lactams (such as epsilon-caprolactam) for aminocarboxylic acids.

MW of X is usually 28–about 1,000 preferably 28–about 600. Ratio of MW of L to MW of X and ratio of MW of M to MW of X are usually at least 4/1, preferably 5/1 about 1,000/1, more preferably 5/1—about 40/1.

The residue X and the residue L or M are linked through linkages formed by reaction of reactive groups (such as isocyanate, carboxylic, carboxylic halide, amino, hydroxyl and epoxy groups) of the linker with terminal functional groups (such as hydroxyl, carboxylic, halide and amino groups) of the polymer constituting the residue L or M. Examples of suitable combinations of reactive or functional groups and the resulting linkages between L and X and between M and X are as follows:

—NCO+HO— → —NH—COO— (urethane);
—NCO+HOOC— → —NH—CO— (amide);
—NCO+R—NH— → —NH—CO—NR— (urea) [R:H or Alkyl];
—COZ+HO— → —COO— (ester) [Z:OH or halogen];
—COZ+H₂N— → —CO—NH— (amide) [Z:OH or halogen];

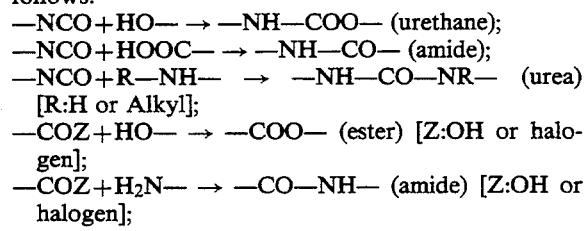

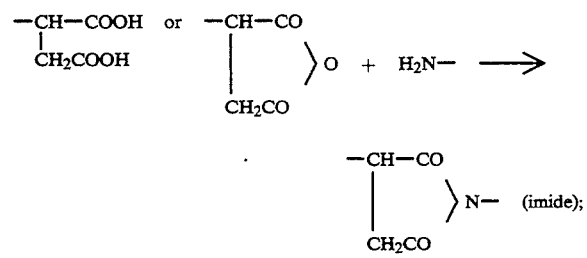

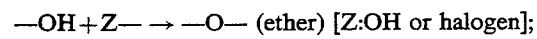

—OH+Z— → —O— (ether) [Z:OH or halogen];

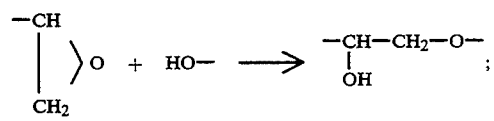

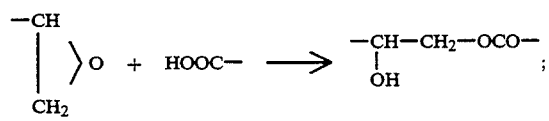

and

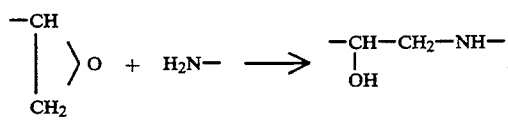

Among these linkages, preferred are urethane and ester, particularly urethane. Weight fraction of these linkages in the compounds of the formula (1) or (2) is generally 0.0005–4% or less, preferably 0.001–3% or less. In case of the compounds of the formula (2), lower weight fraction (0–0.0005%) of these linkages than above is also preferred.

In addition to the linkers as above, polyfunctional compounds (crosslinker) of tri- or higher functionality for example, triols (such as glycerol), triisocyanates (such as IPDI trimer) and the like, may also be used if desired, to introduce branching into the compounds of the formula (1) or (2). The amount of the crosslinker is usually not more than 2% based on the whole moles of the linkers.

In the formulae (1) and (2), L and/or M may be linked to $R_1$ and/or $R_2$, either directly, or indirectly through linkages as above (such as urethane, amide, urea, ester, imide, ether and so on) with or without X. $R_1$ and/or $R_2$ can be originally contained in polymers having L or M, by using initiators or monomers having $R_1$ and/or $R_2$ [for instance, alkyl-containing initiators (such as alkyl lithium), functional group-containing precursors for L or M (such as DI, diols, diamines, dicarboxylic acids, and the like)]; or may be introduced into the polymers afterwards, by modification [for instance, hydroxylation, oxyalkylation, oxidation, carboxylation, alkylation, acylation, alkoxylation, amination or aminoalkylation, or reaction with compounds containing $R_1$ and/or $R_2$ or capable of forming $R_1$ and/or $R_2$. Compounds containing $R_1$ and/or $R_2$ include, for example, ones containing a hydrocarbyl group (such as alkyl) and a reactive group (such as hydroxyl, mercapto, amino, epoxy, isocyanate, or carboxylic group, or the like), and compounds containing two reactive groups as above (such as linkers as mentioned above). Examples of compounds capable of forming $R_1$ and/or $R_2$ maleic compounds (such as maleic anhydride), AO (such as EO and PO).

Dispersants (C) can be produced, in general, (i) by reacting a linker containing X with a polymer containing L (or precursor thereof) and a polymer containing M (or precursor thereof); or (ii) by reacting a $R_1$-containing (or $R_1$-forming) compound and a $R_2$-containing (or $R_2$-forming) compound with a polymer containing L (or precursor thereof) and a polymer containing M (or precursor thereof) with or without a linker containing X.

These reactions may be carried out under usual conditions. The reaction temperature is usually 10°-300° C., preferably 50°-280° C. The reaction pressure is not particularly restricted, and is preferably 0-20 atm, more preferably 0-10 atm (absolute pressure). In case where linkages between L and X or between M and X are formed through condensation, it is preferred to remove low molecular weight byproduct (such as water and hydrogen chloride) under reduced pressure. The reactions may be performed with or without solvent. When used, preferable solvents are ones capable of dissolving all the reactants, and include, for example, THF and N,N-dimethylformamide (hereinafter referred to as DMF). Any known catalyst may also be used, if necessary. Examples of suitable catalysts are sulfuric acid, p-toluenesulfonic acid, sodium acetate and the like, for esterification; and dibutyltin dilaurate, dioctyltin dilaurate, stannous octoate and the like, for urethane-forming reaction. Suitable reaction vessels include, for example, reactors equipped with stirrers, and various mixing machines, such as extruders, Brabenders, kneaders and Banbury mixers.

Producing method of a dispersant (C) is illustrated as follows: a PS oligomer produced by usual anionic living polymerization using butyl lithium is reacted with EO to obtain a PS oligomer having an alkyl group in one end and a hydroxyl group in the other end, which is further reacted with MDI (X-containing linker) to form a PS oligomer (L-containing polymer) having an alkyl group ($R_1$) in one end and an isocyanate group in the other end. The resulting PS oligomer having an isocyanate group is reacted with a hydroxyl-terminated urethane oligomer synthesized from PCL (Mn=2,000) and MDI, under usual conditions at an NCO/OH ratio of 2/1 to produce a PS-polyurethane-PS block copolymer of the formula (2).

Mn of dispersants (C) is usually about 800–about 3,000,000, preferably about 1,000–about 1,000,000.

Among dispersants (C), preferred are polymers having the same or substantially same structural units as the thermoplastic resin (B), and containing functional groups introduced thereinto, selected from the group consisting of isocyanate, carboxylic (anhydride), carboxylic halide, amino, hydroxyl and epoxy groups. In the above, substantially same structural units include those which comprise the repeating units of (B) and may contain optionally other units, as far as compatibility with (B) can be attained. For instance, there can be mentioned hydroxyl-terminated PS oligomer and amino-modified PS, in case where (B) is a PS resin; and amino-modified low MW PP, maleic anhydride-modified PP and hydroxyl-terminated hydrogenated isoprene oligomer, in case of using PP resin as (B).

Illustrative examples of suitable dispersants (C), and suitable combinations of (A), (B) and (C) are as follows. [In the following, mentioned in the parentheses ( ) or { } are specific examples. Bu and Pr represent butyl and propyl, respectively.]

Examples of (C):

(i) compounds represented by the formula:

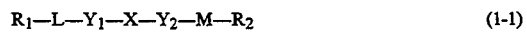

$$R_1—L—Y_1—X—Y_2—M—R_2 \qquad (1\text{-}1)$$

wherein $R_1$ is an alkyl group (Bu, Pr), L is a residue of vinyl polymer (PE, PP, PS), $Y_1$ is —OCO—NH— or —OCO—, X is a residue of DI (MDI,TDI,IPDI) or dicarboxylic acid (adipic acid or dichloride thereof), $Y_2$ is —NH—COO—, M is a residue of urethane oligomer (polyadduct of PCL with MDI), and $R_2$ is OH;

(ii) compounds represented by the formula:

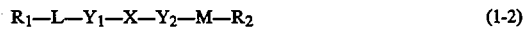

$$R_1—L—Y_1—X—Y_2—M—R_2 \qquad (1\text{-}2)$$

wherein $R_1$ is an alkyl group (Bu, Pr), L is a residue of vinyl polymer (PE, PP, PS), $Y_1$ is —O—, —COO— or —CONH—, X is a residue of diol (EG,TMG) or diamine (EDA, HDA), $Y_2$ is —COO— or —NHCO—, M is a residue of polyamide oligomer (6-nylon oligomer, 6,6-nylon oligomer), and $R_2$ is COOH or $NH_2$ (iii) compounds represented by the formula:

$$R_1—L—R_2 \qquad (2\text{-}1)$$

wherein $R_1$ is an alkyl group (Bu, Pr), L is a residue of a vinyl polymer (PE, PP, PS), and $R_2$ is a succinic acid anhydride group:

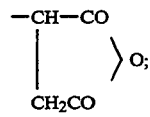

(iv) compounds represented by the formula:

$$R_1-L-Y_1-X-Y_2-M-Y_3-X-Y_4-L-R_2 \quad (2\text{-}2)$$

wherein $R_1$ and $R_2$ are alkyl groups (Bu, Pr), L is a residue of a vinyl polymer (PE, PP, PS), $Y_1$ is —OCO—NH— or —OCO—, X is a residue of DI (MDI,TDI,IPDI) or dicarboxylic acid (adipic acid or dichloride thereof), $Y_2$ is —NH—COO—, M is a residue of a urethane oligomer (polyadduct of PCL with MDI), $Y_3$ is —OCO—NH—, and $Y_4$ is —NH—COO— or —COO—; and (v) compounds represented by the formula:

$$R_1-L-Y_1-X-Y_2-M-Y_3-X-Y_4-L-R_2 \quad (2\text{-}3)$$

wherein $R_1$ and $R_2$ are alkyl groups (Bu, Pr), L is a residue of a vinyl polymer (PE, PP, PS), $Y_1$ is a —O—, —COO— or —CONH—, X is a residue of DI (MDI,TDI,IPDI) or dicarboxylic acid (adipic acid or dichloride thereof), $Y_2$ is —COO— or —NH—COO—, M is a residue of a polyamide oligomer, $Y_3$ is —OCO— or —OCO—NH—, and $Y_4$ is —O—, —OCO— —NHCO—.

(vi) compounds represented by the formula:

$$R_1-L-Y_1-X-Y_2-M-R_2 \quad (1\text{-}3)$$

wherein $R_1$ is HOOC— or $H_2N$—, L is a residue of a polyamide oligomer (6-nylon oligomer, 6,6-nylon oligomer), one end of which having been reacted with alkanol amine (ethanol amine), $Y_1$ is —OCO—NH—, X is a residue of DI (MDI,TDI,IPDI), $Y_2$ is —NH—COO—, M is a residue of a urethane oligomer (polyadduct of PCL with MDI), and $R_2$ is OH;

(vii) compounds represented by the formula:

$$R_1-L-Y_1-X-Y_2-M-Y_3-X-Y_4-L-R_2 \quad (2\text{-}4)$$

wherein $R_1$ and $R_2$ are HOOC— or $H_2N$—, L is a residue of a polyamide oligomers (6-nylon oligomer, 6,6-nylon oligomer), one end of which having been reacted with alkanol amine (ethanol amine), $Y_1$ is —OCO—NH—, X is a residue of DI (MDI,TDI,IPDI), $Y_2$ is —NH—COO—, M is a residue of a urethane oligomer (polyadduct of PCL with MDI), $Y_3$ is —OCO—NH—, and $Y_4$ is —NH—COO—.

(viii) compounds represented by the formula:

$$R_1-L-Y_1-X-Y_2-M-R_2 \quad (1\text{-}4)$$

wherein $R_1$ is HO—, L is a residue of a polyesters (PET,PBT), $Y_1$ is —OCO—NH—, X is a residue of DI (MDI,TDI,IPDI), $Y_2$ is —NH—COO—, M is a residue of a urethane oligomer (polyadduct of PCL with MDI), and $R_2$ is OH.

Examples of combinations

[I] (B)=vinyl polymers (PE, PP, E/P and PS):
  [I-1] (A)=precursors for polyurethanes {polyesters (PCL, PEA)+DI (MDI, TDI, IPDI)}, and (C)=(i), (iii) or (iv);
  [I-2] (A)=polyamide precursors (CL; adipic acid+HDA), and (C) is (ii), (iii) or (v);
  [I-3] (A)=polyepoxide (diglycidyl ether of bisphenol A, diglycidyl ether)+curative {diamines (MDA)}, and (C) is (iii);

[II] (B)=polyamides (6-nylon, 6,6-nylon):
  [II-1] (A)=precursors for polyurethanes {polyesters (PCL, PEA)+DI (MDI, TDI, IPDI)}, and (C)=(vi) or (vii);

[III] (B)=polyesters (PET, PBT):
  [III-1] (A)=precursors for polyurethanes {polyesters (PCL, PEA)+DI (MDI, TDI, IPDI)}, and (C)=(viii).

Among combinations of (A), (B) and (C), preferred are those wherein (A) comprises precursors for polyurethanes or polyepoxide and curative therefor (particularly precursors for polyurethanes), (B) comprises a vinyl polymer (especially polyolefin), and (C) comprises a block copolymer of polyurethane with a vinyl polymer, polyester or polyamide, or a maleic acid-modified vinyl polymer [particularly a block copolymer of polyurethane with a vinyl polymer (especially polyolefin).

In general, resin compositions according to the present invention comprise 5–95%, preferably 10–90% of polymerizate of polymerizable compound (A), 5–95%, preferably 10–90% of thermoplastic resin (B), and 0.05–50%, preferably 0.1–30% of dispersant (C), based on the weight of the composition.

In producing resin compositions by polymerizing a polymerizable compound (A), insitu in a melted thermoplastic resin (B), in the presence of a dispersant (C), in accordance with the invention, polymerization may be carried out at any temperature, as far as the thermoplastic resin (B) can be melted, usually at a temperature of 10°–350° C., preferably 100°–300° C. Reaction pressure is not particularly restricted, and may be reduced pressure (such as 0.1 mm Hg) or upto 20 atm or more (preferably upto 10 atm), in view of industrial production. It is preferred to carry out the reaction in a short time as far as possible in order to prevent thermal degradation of each component during polymerization; and the reaction time is usually 0.5–60 minutes, preferably 1–30 minutes.

Reaction may be carried out in the presence of a catalyst. Suitable catalysts include conventional ones employed for polymerization of (A), for example, organic metal compounds (such as dibutyltin dilaurate, dioctyltin dilaurate and stannous octoate) and amines (such as triethylene diamine and diazabicycloundecene), for urethane-forming reaction. sulfuric acid, p-toluene-sulfonic acid, sodium acetate and the like, for esterification; potassium hydroxide and boron trifluoride, for etherification; radical initiators (such as benzoyl peroxide and azobis-iso-butyronitrile), for vinyl polymerization; pyridine, triethyl amine, tetramethyl ammonium chloride, potassium hydroxide, ferric chloride, triethyl aluminum, trialkyl phosphine and trialkyl borate, for epoxy curing reaction; hydrocloric acid and oxalic acid, for addition condensation of phenols.

In polymerizing (A) insitu in a melted (B) in the presence of a dispersant (C), these components may be added in any order; and there can be mentioned, for instance, methods by charging (A), (B) and (C) at the same time; those by introducing (A) and (B) into melted (C); those by introducing (A) into a melted blend of (B) and (C); those by introducing (A) and (C) separately into melted (B); and those by introducing a blend of (A) and (C) into melted (B). Preferred are those by introducing (A) into a melted blend of (B) and (C).

Suitable reaction vessels include, for example, reactors equipped with stirrers, and various mixing machines, such as extruders, Brabenders, kneaders and Banbury mixers.

Resin compositions, produced by polymerizing a polymerizable compound (A) insitu in a melted thermoplastic resin (B) in the presence of a dispersant (C), according to the present invention, exhibit improved dispersibility of component resins; that is, the thermoplastic resin (B) and polymerizate of the compound (A) are homogeneously distributed, finely devided to a smaller particle diameter, by virtue of the dispersant (C). Besides, resin compositions of the invention containing the dispersant (C) have good stability of the distpersibility and substantially no tendency of increasing particle size during molding; while resin compositions free from (C) are liable to result in increasing of particle size during molding. Accordingly, this invention can be successfully applied for producing composite resin compositions comprising two or more incompatible resins. For instance, difference in SP between (B) and polymerizate of (A) may be varied widely, usually 0.5 or more, and can be as large as 3–5 or more.

The method for producing a resin composition of the present invention is industrially advantageous, since resin compositions can be obtained at one stage within short manufacturing process.

The resulting resin compositions are of improved mechanical properties, such as shock resistance, flexural modulus, tensile strength and so on.

Thus, composite resin compositions according to he invention are useful for molded articles (such as containers, cases, bumpers, hoses, films and the like), as well as other various applications, such as coatings, adhesives, and the like.

Composite resin compositions according to this invention are useful for molded articles (such as containers, cases, bumpers, hoses, films and the like), and other various applications, such as coatings, adhesives, and so on.

Having generally described the invention, a more complete understanding can be obtained by reference to certain specific examples, which are included for purposes of illustration only and not intended to be limiting unless otherwise specified.

In the following examples, parts means parts by weight.

Methods of measurement of properties in examples are as follows:

(1) Impact strength (notched Izod impact strength): according to JIS K7110 (kgf·cm/cm).
(2) Flexural modulus: according to JIS K7203 (kgf/cm$^2$).
(3) Particle diameter:

Rupture cross-section of test piece ruptured within liquified nitrogen was observed with a scanning electron microscope to measure diameter of particles dispersed (microns).

Polymers used in the examples are as follows:
PCL: hydroxyl-terminated PCL (Mn=2,000)
PP: UBE-polypro J609H, produced by Ube Industries, Ltd.
PS: Styron 600, produced by Asahi Kasei Kogyo K. K. 6-nylon:UBE-nylon1013B, produced by Ube Industries, Ltd.

EXAMPLE 1

Using a twin-screw extruder (2D25-S type, produced by Toyo Seiki Seisakisho K. K., 20 mm diameter, L/D=25), 80 parts of PP, 17.8 parts of PCL, 2.2 parts of MDI and 3 parts of maleic anhydride-modified PP (combined maleic acid 5%, Mn=5,000; hereinafter referred to as PP-MA) (dispersant) were melt kneaded at a cylinder temperature of 210° C. for 5 minutes to obtain a resin composition of this invention.

The resulting composition was injection molded at a cylinder temperature of 200° C. into a metal mold of 50° C. to form a test piece; and impact strength, flexural modulus and particle diameter of this piece were measured. The results were as shown in Table 1.

Comparative Example 1
Example 1 was repeated without using PP-MA.

Comparative Example 2
Using the same extruder that used in Example 1, 89 parts of PCL and 11 parts of MDI were melt kneaded at a cylinder temperature of 175° C. for 4 minutes to obtain a polyurethane resin (hereinafter referred to as PU-1), followed by melt kneading 80 parts of PP, 20 parts of PU-1 and 3 parts of PP-MA with the same extruder under the same conditions.

The resulting composition was injection molded and tested in the same manner as in Example 1. The results were as shown in Table 1.

TABLE 1

|  | Example 1 | Comparative Example 1 | Comparative Example 2 |
|---|---|---|---|
| Impact strength | 19 | 11 | 13 |
| Flexural modulus | 11,400 | 9,800 | 10,700 |
| Particle diameter | <0.5 | 5–7 | 2–3 |

EXAMPLE 2

Under an atmosphere of nitrogen, 32.8 parts of PS (Mn=3,300) having a hydroxyl end group, 64.7 parts of hydroxyl-terminated polyurethane (Mn=6,500; hereinafter referred to as PU-2) prepared by polyaddition of MDI with PCL, and 2.5 parts of MDI were reacted within 1,000 parts of DMF for 4 hours at 100° C., followed by distilling off DMF under reduced pressure to obtain a PS-polyurethane block copolymer (Mn=10,000; hereinafter referred to as PS-PU).

Using the same extruder tat used in Example 1, 80 parts of PS, 17.8 parts of PCL, 2.2 parts of MDI and 3 parts of PS-PU (dispersant) were melt kneaded at a cylinder temperature of 175° C. for 3 minutes to obtain a resin composition of this invention.

The resulting composition was injection molded in the same manner as in Example 1; and impact strength and particle diameter of test piece were measured. The results were as shown in Table 2.

Comparative Example 3
Example 2 was repeated without using PS-PU.

Comparative Example 4
Using the same extruder that used in Example 2, 80 parts of PS, 20 parts of PU-1 and 3 parts of PS-PU were melt kneaded under the same conditions as Example 2.

The resulting composition was injection molded and tested in the same manner as in Example 2. The results were as shown in Table 2.

TABLE 2

|  | Example 2 | Comparative Example 3 | Comparative Example 4 |
|---|---|---|---|
| Impact strength | 28 | 13 | 19 |
| Particle diameter | <0.5 | 5–7 | 2–3 |

EXAMPLE 3

Under an atmosphere of nitrogen, 32.8 parts of 6-nylon oligomer (Mn=2,570) having a hydroxyl end group, 53.5 parts of PU-2 and 4.1 parts of MDI were reacted for 4 hours at 100° C. to obtain a nylon-polyurethane-nylon block copolymer (Mn=12,000; hereinafter referred to as NY-PU).

Using the same extruder that used in Example 1, 60 parts of 6-nylon, 35.6 parts of PCL, 4.4 parts of MDI and 5 parts of NY-PU (dispersant) were melt kneaded at a cylinder temperature of 230° C. for 5 minutes to obtain a resin composition of this invention.

The resulting composition was injection molded at a cylinder temperature of 230° C. into a metal mold of 80° C. to form a test piece; and impact strength and particle diameter of test piece were measured. The results were as shown in Table 3.

Comparative Example 5

Example 1 was repeated without using NY-PU.

Comparative Example 6

Using the same extruder that used in Example 3, 60 parts of 6-nylon, 40 parts of PU-1 and 5 parts of PS-PU were melt kneaded under the same conditions as Example 3.

The resulting composition was injection molded and tested in the same manner as in Example 3. The results were as shown in Table 3.

TABLE 3

|  | Example | Comparative Example | |
| --- | --- | --- | --- |
|  | 3 | 5 | 6 |
| Impact strength | 55 | 35 | 41 |
| Particle diameter | <0.5 | 3-5 | 1-2 |

EXAMPLE 4

Using the same extruder that used in Example 1, 80 parts of PP, 20 parts of epsilon-caprolactam, 0.5 parts of potassium hydride, 0.3 parts of N-acetyl-epsilon-caprolactam and 5 parts of PP-MA (dispersant) were melt kneaded under the same conditions as Example 1 to obtain a resin composition of this invention.

The resulting composition was injection molded in the same manner as in Example 1; and impact strength, flexural modulas and particle diameter of test piece were measured. The results were as shown in Table 2.

Comparative Example 7

Example 4 was repeated without using PP-MA.

Comparative Example 8

Using the same extruder that used in Example 4, 80 parts of PP, 20 parts of 6-nylon and 5 parts of PS-PU were melt kneaded under the same conditions as Example 4.

The resulting composition was injection molded and tested in the same manner as in Example 4. The results were as shown in Table 4.

TABLE 4

|  | Example | Comparative Example | |
| --- | --- | --- | --- |
|  | 4 | 7 | 8 |
| Impact strength | 40 | 25 | 32 |
| Flexural modulus | 16,500 | 13,000 | 15,000 |
| Particle diameter | <0.5 | 5-7 | 2-3 |

EXAMPLE 5

Using the same extruder that used in Example 1, 80 parts of PP, 12.6 parts of diglycidyl ether of bisphenol A, 7.4 parts of MDA and 5 parts of PP-MA were melt kneaded under the same conditions as Example 1 to obtain a resin composition of this invention.

The resulting composition was injection molded in the same manner as in Example 1; flexural modulas and particle diameter of test piece were measured. The results were as shown in Table 5.

Comparative Example 9

Example 5 was repeated without using PP-MA.

TABLE 5

|  | Example 5 | Comparative Example 9 |
| --- | --- | --- |
| Flexural modulus | 19,400 | 15,800 |
| Particle diameter | 2-3 | 7-10 |

What is claimed as new and desired to be secured by Letters Patent is:

1. A process for producing a moldable resin composition, which comprises polymerizing a polymerizable compound (A), in situ in a melted thermoplastic resin (B), in the presence of a dispersant (C) reactive or compatible with at least one of the resin (B) and polymerizate of (A),
   wherein said resin (B) is at least one resin selected from the group consisting of vinyl polymers, polyesters, polyamides, polyimides, polyethers and polyurethanes, having a number-average molecular weight of about 10,000–about 3,000,000; and wherein said compound (A) is selected from the group consisting of
   1) precursors for polyurethane;
   2) precursors for epoxy resin;
   3) precursors for polyester;
   4) precursors for polyamide or polyimide;
   5) one or more of vinyl compounds and unsaturated polyesters, or oligomer thereof;
   6) a ring-opening polymerizable cyclic ester, cyclic amide or cyclic ether; and
   7) precursors for phenolic resin or amino resin.

2. The process of claim 1, wherein said dispersant (C) is a polymer comprising (a) a moiety of a polymer having a number average molecular weight of about 500–about 3,000,000 and containing structural units substantially same as polymerizate of said compound (A) and (b) a moiety of a polymer having a number average molecular weight of about 500–about 3,000,000 and containing structural units substantially same as said resin (B).

3. The process of claim 2, wherein said moiety (a) and said moiety (b) is linked through at least one linker selected from the Group consisting of organic diisocyanates, dicarboxylic acids, diamines, diols and diepoxides.

4. The process of claim 1, wherein said dispersant (C) is represented by the general formula (1) or (2):

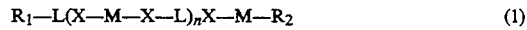

$$R_1-L(X-M-X-L)_nX-M-R_2 \quad (1)$$

$$R_1-L(X-M-X-L)_n-R_2 \quad (2)$$

wherein $R_1$ and $R_2$ are independently selected from the group consisting of hydrocarbyl, acyl, alkoxy, hydroxyl, mercapto, amino, epoxy, isocyanate, carboxylic, carboxylic anhydride, carboxylic halide and aldehyde groups; L and M are residues of a polymer having a number average molecular weight of about 500–about 3,000,000, the difference in solubility parameter between the residue L or M and said resin (B) or polymerizate of said compound (A) being not more than 0.5; X is a residue of a difunctional compound selected from the group consisting of organic diisocyanates, dicarboxylic acids, diamines, diols and diepoxides, the molecular weight of X being not more than a quater of that of L and M; and n is 0 or an integer of at least 1.

5. The process of claim 1, wherein said dispersant (C) is a maleic acid-modified polyolefin.

6. The process of claim 1, wherein said dispersant (C) is a block copolymer of polyurethane with vinyl polymer, polyester or polyamide.

7. The process of claim 1, wherein said dispersant (C) has an number average molecular weight of about 8000– about 3,000,000.

8. The process of claim 1, wherein said resin (B) is an olefinic polymer, having a number-average molecular weight of about 10,000–about 3,000,000.

9. The process of claim 1, wherein said compound (A) comprises an active hydrogen atom-containing component and a polyisocyanate component.

10. The process of claim 1, wherein said compound (A) comprises a polyepoxide and a curative therefor.

11. The process of claim 1, wherein said compound (A) comprises a ring-opening polymerizable cyclic ester, cyclic amide or cyclic ether.

12. The process of claim 1, wherein (B) is a vinyl polymer; and
   (A) is precursors for polyurethane comprising an active hydrogen atom-containing component and a polyisocyanate component, and (C) is (i), (iii) or (iv);
   (A) is one or more precursors for polyamide comprising a lactam, or a dicarboxylic acid component and an diamine component, and (C) is (ii), (iii) or (v); or
   (A) comprises a polyepoxide and a curative therefor, and (C) is (iii);
wherein
(i) is a compound represented by the formula:

$$R_1—L—Y_1—X—Y_2—M—R_2 \qquad (1-1)$$

wherein $R_1$ is an alkyl group, L is a residue of a vinyl polymer, $Y_1$ is —OCO—NH— or —OCO—, X is a residue of a diisocyanate or dicarboxylic acid, $Y_2$ is —NH—COO—, M is a residue of a urethane oligomer, and $R_2$ is OH;

(ii) is a compound represented by the formula:

$$R_1—L—Y_1—X—Y_2—M—R_2 \qquad (1-2)$$

wherein $R_1$ is an alkyl group, L is a residue of a vinyl polymer, $Y_1$ is —O—, —COO— or —CONH—, X is a residue of a diol or diamine, $Y_2$ is —COO— or —NHCO—, M is a residue of a polyamide oligomer, and $R_2$ is COOH or $NH_2$ (iii) is a compound represented by the formula:

$$R_1—L—R_2 \qquad (2-1)$$

wherein $R_1$ is an alkyl group, L is a residue of a vinyl polymer, and $R_2$ is a succinic acid anhydride group;

(iv) is a compound represented by the formula:

$$R_1—L—Y_1—X—Y_2—M—Y_3—X—Y_4—L—R_2 \qquad (2-2)$$

wherein $R_1$ and $R_2$ are alkyl groups, L is a residue of a vinyl polymer, $Y_1$ is —OCO—NH— or —OCO—, X is a residue of a diisocyanate or dicarboxylic acid, $Y_2$ is —NH—COO—, M is a residue of a urethane oligomer, $Y_3$ is —OCO—NH—, and $Y_4$ is —NH—COO— or —COO—; and (v) is a compound represented by the formula:

$$R_1—L—Y_1—X—Y_2—M—Y_3—X—Y_4—L—R_2 \qquad (2-3)$$

wherein $R_1$ and $R_2$ are alkyl groups, L is a residue of a vinyl polymer, $Y_1$ is a —O—, —COO— or —CONH—, X is a residue of a diisocyanate or dicarboxylic acid, $Y_2$ is —COO— or —NH—COO—, M is a residue of a polyamide oligomer, $Y_3$ is —OCO— or —OCO—NH—, and $Y_4$ is —O—, —OCO— or —NHCO—.

13. The process of claim 1, wherein (B) is a polyamide; (A) is precursors for polyurethane, comprising an active hydrogen atom-containing component and a polyisocyanate component; and (C) is (vi) or (vii);
wherein
(vi) is a compound represented by the formula:

$$R_1—L—Y_1—X—Y_2—M—R_2 \qquad (1-3)$$

wherein $R_1$ is HOOC— or $H_2N$—, L is a residue of a polyamide oligomer, one end of which having been reacted with alkanol amine, $Y_1$ is —OCO—NH—, X is a residue of a diisocyanate, $Y_2$ is —NH—COO—, M is a residue of a urethane oligomer, and $R_2$ is OH;

(vii) is a compound represented by the formula:

$$R_1—L—Y_1—X—Y_2—M—Y_3—X—Y_4—L—R_2 \qquad (2-4)$$

wherein $R_1$ and $R_2$ are HOOC— or $H_2N$—, L is a residue of a polyamide oligomers, one end of which having been reacted with alkanol amine, $Y_1$ is —OCO—NH—, X is a residue of a diisocyanate, $Y_2$ is —NH—COO—, M is a residue of a urethane oligomer, $Y_3$ is —OCO—NH—, and $Y_4$ is —NH—COO—.

14. The process of claim 1, wherein (B) is a polyester; (A) is precursors for polyurethane, comprising an active hydrogen atom-containing component and a polyisocyanate component; and (C) is a compound represented by the formula:

$$R_1—L—Y_1—X—Y_2—M—R_2 \qquad (1-4)$$

wherein $R_1$ is HO—, L is a residue of a polyesters, $Y_1$ is —OCO—NH—, X is a residue of a diisocyanate, $Y_2$ is —NH—COO—, M is a residue of urethane oligomer, and $R_2$ is OH.

15. The process of claim 1, which comprises 5–95% of polymerizate of (A), 5–95% of (B), and 0.05–50% of (C), based on the weight of the composition.

16. A resin composition, produced by the process of claim 1.

17. A moldable composite resin composition having improved dispersibility of the component resins, which comprises a polymerizate of a polymerizable compound (A), a thermoplastic resin (B), and a dispersant (C) reactive or compatible with at least one of said resin (B) and said polymerizate;
   wherein said compound (A) has been polymerized in situ in melted said resin (B) in the presence of said dispersant (C),
   wherein said resin (B) is at least one resin selected from the group consisting of vinyl polymers, polyesters, polyamides, polyimides, polyethers and polyurethanes, having a number-average molecular weight of about 10,000–about 3,000,000; and wherein said compound (A) is selected from the group consisting of
1) precursors for polyurethane;
2) precursors for epoxy resin;
3) precursors for polyester;
4) precursors for polyamide or polyimide;
5) one or more of vinyl compounds and unsaturated polyesters, or oligomer thereof;
6) a ring-opening polymerizable cyclic ester, cyclic amide or cyclic ether; and
7) precursors for phenolic resin or amino resin.

18. A molded article having improved impact strength, which comprises the composite resin composition of claim 17.

19. The process of claim 1, wherein the dispersant (C) is at least one polymer selected from the group consisting of:
   i.) polymers having the same structural units or substantially the same solubility parameter as the resin (B) or polymerizate of (A) and having at least one reactive group selected from the group consisting of isocyanate, carboxylic, carboxylic anhydride, carboxylic halide, amino, hydroxyl, aldehyde and epoxy groups, wherein substantially same solubility parameter means that the difference in solubility parameters is not more than 0.5, and
   ii) polymers comprising (a) a moiety of a polymer having the same structural units or substantially same solubility parameter as polymerizate of (A) and (b) a moiety of a polymer having same structural units or substantially same solubility parameter as the resin (B), wherein substantially same solubility parameter means that the difference in solubility parameters is not more than 0.5.

20. The process of claim 19, wherein said reactive group is carboxylic, carboxylic anhydride or carboxylic halide.

21. The process of claim 3, wherein said linker is organic diisocyanate.

22. The process of claim 4, wherein $R_1$ is hydrocarbyl and $R_2$ is carboxylic, carboxylic anhydride or carboxylic halide.

23. The process of claim 1, wherein the dispersant (C) has substantially same solubility parameter with at least one of the resin (B) and polymerizate of (A), substantially same solubility parameter meaning that the difference in solubility parameters is not more than 0.5.

24. The process of claim 1, wherein the precursors for polyurethane comprise an active hydrogen atom-containing component and a polyisocyanate component;

the precursors for epoxy resin comprise a polyepoxide and a curative therefor;

the precursors for the polyester comprise a polycarboxylic acid component and a polyol component;

the precursors for polyamide or polyimide comprise a polycarboxylic acid component and a polyamine component; and the precursors for phenolic resin or amino resin comprise an aldehyde and a phenol, urea or melamine, or precondensate thereof.

the precursors for phenolic resin or amino resin comprise an aldehyde and a phenol, urea or melamine, or precondensate thereof.

25. The composition of claim 17, wherein the precursors for polyurethane comprise an active hydrogen atom-containing component and a polyisocyanate component;

the precursors for epoxy resin comprise a polyepoxide and a curative therefor;

the precursors for polyester comprise a polycarboxylic acid component and a polyol component;

the precursors for polyamide or polyimide comprise a polycarboxylic acid component and a polyamine component; and the precursors for phenolic resin or amino resin comprise an aldehyde and a phenol, urea or melamine, or precondensate thereof.

26. The process of claim 1, wherein the difference in solubility parameter between said resin (B) and polymerizate of (A) is 0.5 or more.

27. The composition of claim 17, wherein the difference in solubility parameter between said resin (B) and polymerizate of (A) is 0.5 or more.

* * * * *